United States Patent
Bergmark

(12)
(10) Patent No.: US 6,578,507 B1
(45) Date of Patent: Jun. 17, 2003

(54) SAILING BOAT

(76) Inventor: Pontus Bergmark, Letsegardsvagen 35, SE-427 40 Billdal (SE)

( * ) Notice: Subject to any disclaimer, the term of this patent is extended or adjusted under 35 U.S.C. 154(b) by 0 days.

(21) Appl. No.: 10/019,233

(22) PCT Filed: Jun. 26, 2000

(86) PCT No.: PCT/SE00/01344
§ 371 (c)(1),
(2), (4) Date: Dec. 28, 2001

(87) PCT Pub. No.: WO01/00483
PCT Pub. Date: Jan. 4, 2001

(30) Foreign Application Priority Data

Jun. 28, 1999 (SE) .............................................. 9902435

(51) Int. Cl.⁷ .............................................. B63B 35/00
(52) U.S. Cl. ..................... 114/39.24; 114/272; 114/274
(58) Field of Search .............................. 114/39.24, 272, 114/274

(56) References Cited

U.S. PATENT DOCUMENTS

| 3,286,673 A | | 11/1966 | Nason | |
|---|---|---|---|---|
| 3,747,549 A | | 7/1973 | Shutt | |
| 3,802,366 A | | 4/1974 | Mankawich | |
| 3,870,004 A | | 3/1975 | Bailey | |
| 5,054,411 A | * | 10/1991 | Nelson | 114/39.24 |
| 5,168,824 A | * | 12/1992 | Ketterman | 114/275 |
| 6,024,041 A | * | 2/2000 | Eglais | 114/274 |

* cited by examiner

*Primary Examiner*—Jesus D. Sotelo
(74) *Attorney, Agent, or Firm*—Birch, Stewart, Kolasch & Birch, LLP

(57) ABSTRACT

A sailing vessel has a hull, two outriggers, one on either side of the hull, a rudder, and rigging supporting at least one sail. Wings are secured to the outriggers and arranged to be located below the surface of the water during sailing. The leeward wing being arranged, as the vessel moves through water, to exert an upwards directed force and the windward wing being arranged to exert a downwards directed force to counteract the rotational force from the sails.

25 Claims, 3 Drawing Sheets

SAILING BOAT

This application is the national phase under 35 U.S.C. §371 of PCT International Application No. PCT/SE00/01344 which has an International filing date of Jun. 26, 2000, which designated the United States of America and was published in English.

TECHNICAL FIELD

The present invention relates to a sailing vessel comprising a hull, two outriggers, one on either side of the hull, a rudder, and rigging supporting at least one sail.

BACKGROUND

Moderns sailing vessels balance the wind-power forces acting on the sail via displacement of crew, water tanks, keel, etcetera. In this kind of boats, the force of the wind acting on the sail consequently is balanced by displacement of the centre of gravity. The moments of force must be balanced, i.e. the wind power multiplied by the distance from the keel or the centre-board centre to the sail centre is to be balanced relative to the keel displacement and/or the centre of gravity of the crew multiplied by the horizontal distance of the centre of gravity from the centre of the boat. In the case of non-planing boats, the speed through the water is limited to about half the speed of the wind. In addition, modern displacement-boat constructions are designed for an upper wind-force limit, known as the design wind. Wind speeds above the design wind do not increase the speed of the boat; instead, the surplus power is "dumped" or caused to pass by.

It is previously known to arrange water-submerged hydrofoils to cause the boat to plane. However, the purpose of such hydrofoils is not to counter-act the wind-power moment, with the exception of the special case of sailing before the wind.

U.S. Pat. No. 3,747,549 describes a sailing vessel comprising on the windward side an outrigger with a wing thereon submerged into the water. By adjusting the angle of the wing, it becomes possible to adjust the counter-acting force on the sail.

U.S. Pat. No. 3,870,004 concerns another type of sailing vessel, which is more like a multi-hull boat. In addition, in this case a counter-acting force on the sail is achieved by means of a water-submerged wing. However, the counter-acting force is not generated by the water flow around the wing but rather by a frictional force. The principle of generation of the counter-acting force thus is essentially different.

In the case of these two prior-art vessels, a counter-acting force against the wind thus is obtained by means of one outrigger only, equipped with a water wing. In addition, it is not possible to fit these boat constructions with several outriggers, since the structure designed to sense the position of the wing and the mechanics of controlling it are adapted for one single wing. In addition, the construction as shown causes considerable friction and resistance to flow. The result is a considerable moment, and considerable rudder deflection is necessary to steer the boat back on course with consequential reduction of speed. In addition, the boat tends to luff strongly and has a tendency to haul the wind. Therefore, it can only sail before the wind and in addition on one bow only.

OBJECT OF THE INVENTION

Consequently, it is one object of the invention to provide a vessel that is faster and makes more efficient use of the wind than do hitherto known boat constructions.

SUMMARY OF THE INVENTION

In accordance with the invention, a sailing vessel is provided, comprising a hull, two outriggers, one on either side of the hull, a rudder, and rigging supporting at least one sail. In addition, the vessel comprises wings secured to the outriggers and arranged to be located below the surface of the water during sailing, the leeward wing arranged, as the vessel moves through water, to exert an upwards directed force and the windward wing arranged to exert a downwards directed force to counter-act the rotational force from the sails.

The two wings offer almost equal resistance to the flowing water. As a result, the rotational moments that cause the course of the vessel to change, cancel each other out. In addition, this arrangement provides the further advantage that the load exerted on the vessel by the downwardly directed wing is largely compensated by the upwards directed force leeward. A centreboard or keel is no longer necessary to provide the sailing vessel with the force counter-acting the sail force that would turn the vessel leeward via the mast. Furthermore, less friction is generated when the leeward wing is given lift than if the entire lift were to be taken by the hull. Also, the hull offers larger resistance to flow, friction and loss through splashing, and so on, than does a water-submerged wing, which re-creates the energy consumed to displace the water ahead, in that the energy is recreated when the water molecules are "re-positioned" once the wing has passed. Because it becomes possible to eliminate keel or centreboard, the flow across a rudder positioned at the rear centre also becomes less turbulent, which reduces the resistance to flow to a fraction compared with conventional vessels.

Without a deflection of the leeward wing counter-acting the windward wing, a very strong force would, in the absence of a centreboard, have acted on the vertical profile components, in which the water wings preferably are secured. The latter would have been affected like swords or centreboards by very strong lateral forces. Because the leeward wing absorbs a large proportion of these forces, the vertical profile components can, however be relieved almost entirely. The vertical profile components do, however also prevent leeward drift. In order to prevent turning moments, the vertical profile components preferably are located oppositely the sail centre amidships, just as is done with a centreboard.

By means of the invention, it is estimated that speeds double the speed of the wind, may be obtained. In addition, the present sea yacht has no upper limiting wind speed, but as the wind speed increases and the velocity increases, also the counter-acting force of the water-submerged wing increases, and therefore the wind force may be balanced also under conditions of very strong winds.

In the sailing vessel in accordance with the invention, the rigging size may be increased relative to the size of the hull compared with vessels balanced by means of gravity. The speed in water thus is higher also in weak winds and the possibility of attaining speeds may reach levels equal to those obtained wintertime by ice yachts (which are displacement-balanced).

According to a further aspect of the invention, the sailing vessel also comprises at least one boom having a width perpendicularly to the plane of extension of the sails, which at least equals the width of the mast and which preferably considerably exceeds said width. In this manner, the leak from the pressure side to the suction side of the sails is reduced, the belly of the sail may be optimised, and consequently the wind can be used more efficiently.

According to a further aspect of the sailing vessel in accordance with the invention, it further comprises two rudder vanes spaced from one another and each projecting from either side of the hull or the prolongation thereof. The arrangement results in less resistance in water, and consequently in higher speeds.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described for exemplifying purposes in more detail by means of one embodiment and with reference to the accompanying drawings, wherein.

DETAILED DESCRIPTION OF PREFERRED EMBODIMENTS

Figure 1:
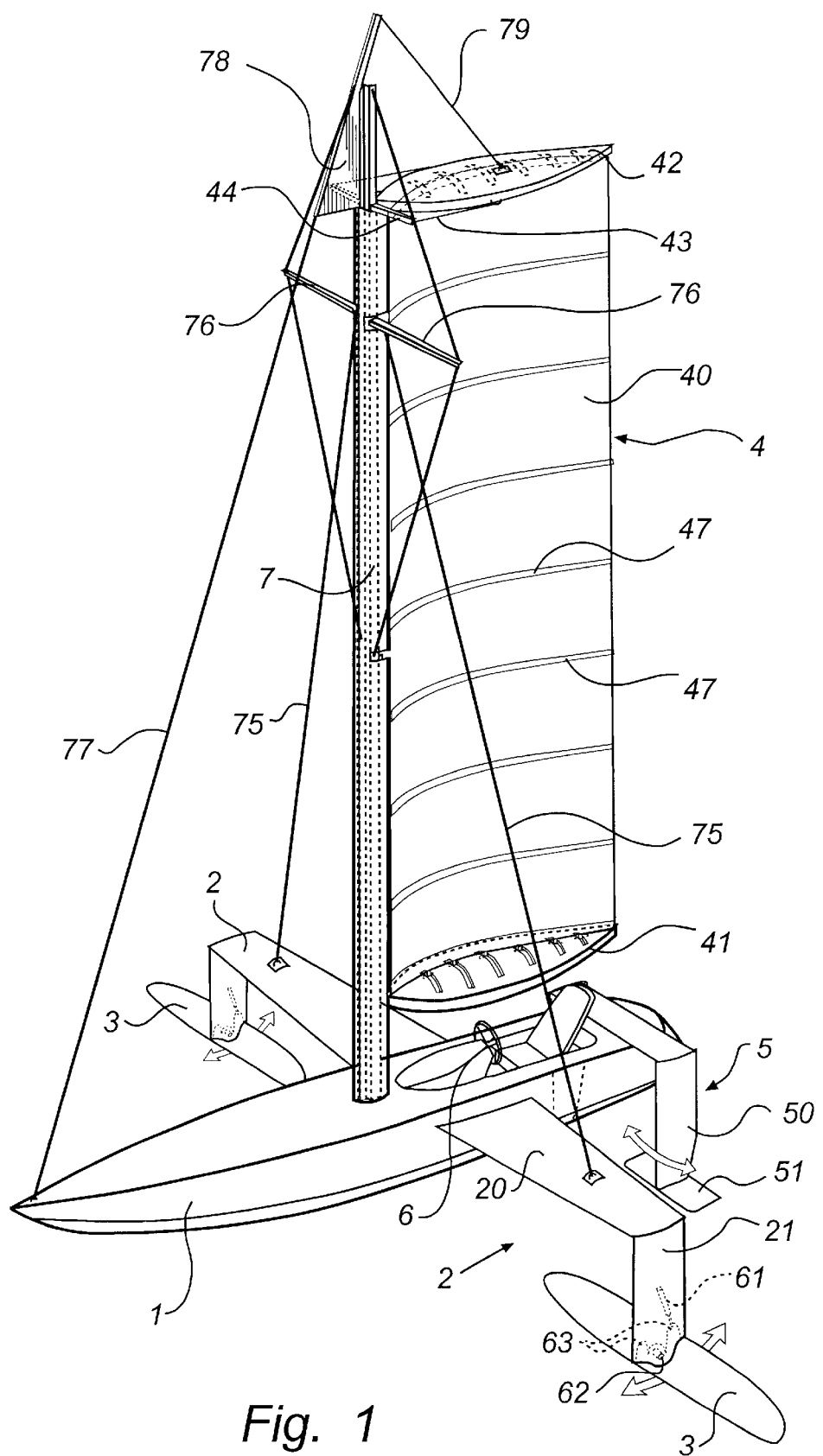
FIG. 1 is a perspective view of a sailing vessel in accordance with one embodiment of the invention.

The sailing vessel in accordance with the invention consists of a hull 1, outriggers 2 equipped with wings 3, a rudder 5 and in some cases a centreboard (not shown). The rigging includes those devices above deck of the vessel that are used to support and control the single or several sails 40 of the vessel. The rigging also comprises the mast 7, the booms 41, 42, the tackle and the like. The hull preferably is narrow, lightweight and planing.

Outriggers and Wings

FIG. 1 shows a preferred embodiment of a sailing vessel in accordance with the invention. In the inventive sailing vessel the force counter-acting the wind-power force acting on the sails is obtained by two wings 3, which in the use of the vessel are submerged into the water and the force of which is generated by the speed of the wings as they move through the water. When the wind-power force acting on the sail varies, this counter-acting force is adjusted by re-setting of the angle of the wing relative to the direction of travel. The wings are located on outriggers 2 on the right-hand as well as on the left-hand side of the hull. The inclination of the wing to the direction of travel and the speed through the water determines the force that is directed upwards or downwards. Suitably, the windward (wind side) wing is given a downwardly directed force whereas the leeward wing is given an upwardly directed force. The relative setting of the wings should be such as to avoid tendencies in the vessel to turn. Preferably, the wings are arranged to be easily controllable from the cockpit.

The wind as a source of energy is made only partial use of by the propelling techniques employed today in sailing. The modern sailing technique is based on the principle that wind power acting on the sail is balanced by the force of gravity, which provides a counter-acting force originating from the keel and/or the crew. The moments 6f force, i.e. the wind power multiplied by the distance from the keel or the centre-board centres to the sail centre are to be balanced relative to the keel displacement and/or centre of gravity of the crew multiplied by the horizontal distance of the centre of gravity of the crew from the centre of the boat. In contrast hereto, in the inventive sailing vessel the counter-acting force is obtained instead via two wings that are submerged into the water. The wings are located on outriggers, and preferably so as to extend perpendicularly to the hull laterally of the sail centre, one on either side of the hull. The angle of the wing relative to the direction of travel determines the force that can be directed downwards or upwards. Generally, the windward wing is given a downwardly directed force whereas the leeward wing is given an upwardly directed force. Because the leeward wing provides an upwards directed force, there is less load on the hull and the losses are reduced, since the losses of the wing are small compared with what would be the case, should a corresponding force be supported by the hull. In consequence, the speed is increased additionally. To prevent dipping of one of the wings, the outriggers preferably are designed to provide an upwardly directed force, should they happen to be below the surface of the water.

Preferably, the outriggers are designed as arms 20 projecting essentially horizontally from the hull and additional arms 21 securely attached to the outer ends of the arms 20 and extending preferably vertically therefrom. The wings 3 are located at the lower ends of the vertical arms 21. Owing to this arrangement, the horizontal arms 20 absorb the largest forces originating from the sails by way of the shrouds and from the wings by way of the vertical arms. It is therefore suitable to make the horizontal arms 20 especially strong. Preferably, the mast also rests on part of the horizontal arms. The attachment of the horizontal arms to the hull therefore is not critical, because although the sheeting and rudder forces are absorbed by the hull, they are not critical. On the extreme end of the horizontal arms, floats or buoyancy bodies preferably are provided to ensure an upright position of the vessel during standstills and starts. Thanks to this structure, the vessel may be manufactured for easy dismantling, which is desirable for transportation and similar purposes.

As will be appreciated, it is quite possible to arrange the outriggers in such a manner that they extend arcuately outwardly from the hull.

In addition, at least some of the parts of the outriggers that are above the surface of the water and project horizontally from the hull preferably are given a wing-shaped profile configuration. Owing to this configuration, the, airflow past the outriggers contribute to exerting a lifting force on the vessel. This reduces the draught and consequently also the resistance of the water relative to the hull of the vessel.

In addition, those parts of the outriggers that in use normally are above the surface of the water are equipped with flaps or similar means, which preferably are operable from the cockpit. These flaps may be used as supplements to the rudder to control and decelerate the vessel.

The vertical arms 21 are fastened to the horizontal arms 20. A hydraulic line preferably runs inside the vertical arms down to a piston-and-cylinder unit 61, which controls the inclination of the wing via an attachment to the trailing edge of the wing. Other suitable solutions may be mechanical stays that are actuated either manually or by power-driven means, for example via a screw or cog transmission arrangement. A means 62 for articulated attachment to the wing is mounted in the vertical arm. The attachment means is able to absorb upwardly directed, downwardly directed as well as angular forces on the wing. The vertical arms will prevent lateral displacement of the sea yacht. These forces could be considerable but owing to the lateral forces of the sail being relieved by the wings, also the lateral forces of the vertical arms are reduced to moderate levels.

The wings could be configured for example in accordance with NASA 0010 or be given some other suitable profile configuration for increased lifting capability, and configured for laminar or turbulent flow. The means of attachment to the vertical arm is configured as a balanced rudder, wherein a minimum moment force generates upon load on the wing. The means of attachment 62 is articulated and positioned in the wing interior in order not to disturb the flow of the water. The attachment means should be mounted in the vertical arm, and preferably the wing may be detachable and attachable to the vertical arm by simple manipulation. Preferably centrally on the upper face of the wing upstanding profile members 63 are stationarily mounted, said profile members being configured to match corresponding recesses formed in the vertical arms, however so as to allow movement of the profile members in the interior of the vertical arms during setting of the angle of the wing. The profile members provide support against the torsional forces to which the wing is exposed. The wing is manufactured to high strength. The surface of the wing is manufactured to sufficient area to counter-act the sail forces. The dynamic forces increase with increasing speeds, when the sail forces increase as well. By adjusting the angle of the wings, balance is achieved between the sail and the wing forces. The angular inclination of the wings could also be adjusted by means of rigid interconnection between the wings and the vertical arms, in which case the vertical arms are instead articulated to the horizontal arms. The measurements in the case of a smaller vessel could, as regards the wing, be e.g. a wing thickness of 15 mm and a wing-width of 600 mm, the distance from the front edge to the trailing edge of the wing being 150 mm. However, the wing could be dimensioned to the desired size and area. Similar hydrodynamic wing profile configurations are preferably used for the vertical arms. The decelerating force is in this case very small when the wing is at a small angle but the decelerating effect increases strongly when the angles are larger. In accordance with the teachings of the invention, the wings therefore preferably are dimensioned for use at angles <6°. The force developed by the wing could be described as $F=\frac{1}{2}\rho *A*\sin(\alpha)*v^2$, wherein $\rho$ is the density of water (approximately 1000), A is the area, $\alpha$ is the angle to the passing water flow, and v is the speed of the water flow.

In sailing, a counter-acting force may be obtained by means of the wings, thus obviating the need for both a keel and ballast, such as the weight of the crew. Preferably, the windward wing extends obliquely downward with the result that the force on the horizontal arm will be directed downward on the weather side. At the same time, the wing on the leeward side is given a preferably approximately equal upwardly directed inclination. Thanks to this arrangement, a minimum of course corrections become necessary and less propulsion energy is required while at the same time the hull balances the wind power and the sail power.

The wings on the vessel in accordance with the invention do not act as floats, like they do in multi-hull vessels, but preferably they lack lifting buoyancy or possess a lifting buoyancy that is not essential compared with the dynamic force of the wings generated during sailing by the passing water flows. Preferably, the wings therefore have an average density exceeding 0.5 * (density of water), and preferably an average density, which essentially equals the density of water. However, it is likewise possible to use wings having an average density higher than that of water and consequently exerting negative buoyancy.

Preferably, the wings may be actuated by means of control means 6 that are accessible from the cockpit. The control means could comprise means for adjustment by means of a hydraulic system, as mentioned previously, by means of a pump that pumps oil to pistons 61 located in the vertical arms immediately above the wings and serving to adjust the angle of the wings. However, it is advantageous to use a manually operated hydraulic system together with a centrally located wheel, or a similar actuating means, which, when turned, forces hydraulic fluid through the lines. Pumping in the direction towards one of the cylinders has the effect of simultaneously withdrawing fluid from the other cylinder. As result, when one of the wings is angled upwards, the other wing is angled downwards. By means of small wheel movements, it becomes possible to achieve minute changes of the angle, whereby the yacht may be maintained in a horizontal position. The sailing vessel in accordance with the invention essentially does not heel but sails in an absolutely upright position. In a corresponding manner, windward "load" gives leeward "buoyancy". Owing to the angular positions, the rotating moment forces equal each other out, which forces the decelerating effects of the wings would otherwise have provided, had they not both been decelerating. The decelerating forces developed as a result of the angular position of the wings are small. Other alternatives, such as power-driven hydraulic systems, mechanical systems including for instance belts or wires, electric systems, and so on, may be suitable for small vessels. Angular-position sensor may be used for adjustment in order to achieve upright, i.e. not heeled, sailing.

The forces acting on the horizontal arm are directed downwards via the windward vertical arm and counter-act the upwardly directed forces exerted by the rigging via for example shrouds secured in the horizontal arms. The upwardly directed force in the leeward vertical arm acts only on the leeward horizontal arm. It is essential that the sail centre and the wing centre (the points of actuation of the force vectors) are close to one another in the same plane, as otherwise a considerable force moment generates that it becomes necessary to counter-act by means of the rudder. The difference between arranging for the leeward wing and not the hull to absorb the counter-acting force on the sail not absorbed by the windward wing, is the considerably lesser losses of the wing. The energy consumed in the leading part of the wing, where the water is displaced, is re-created at its trailing part, whereas a loaded hull generates much more turbulence, splash and other losses. By relieving the hull by means of the leeward wing, the downwards directed force on the hull becomes smaller (the hull becomes "lighter), which reduces the resistance of the water. Generally speaking, this increases the speed and makes it possible for the vessel to plane also in light winds. The angle of the wings relative to the horizontal plane preferably lies within ±5° during sailing. With such deflections, the losses are very small, owing to the efficiency of the profile configuration of the wings presenting small resistance.

Normally, the angle of the sail to the wind is considerable in a sailing vessel involving strong lateral forces whereas in a high-speed sailing vessel in accordance with the invention an apparent-wind direction coming more head-on and increasing the forwards directed force is generated.

In operation, the angle of the wings should be adjusted to ensure that the wings are below the surface of the water.

The ratio of the area of the water wings (i.e. the area of the upper or lower side) to the sail preferably should equal the density ratios of air to water. Consequently, the sail-area should be 1000 times larger than the area of the windward wing. The forces developed by respectively the wings and the sail could be described as $F=C*\rho*A*\sin(\alpha)*v^2$, wherein $\rho$ is the density, A is the area, $\alpha$ is the angle to the passing medium, and v is the speed of the flow. For the wings, i.e. when the medium is water, C is approximately ½, the density is approximately 1000 kg/m³, the angle is small, preferably between 0° and 6°, and the speed v is the speed of the vessel relative to the water. For the sail, i.e. when the medium is air, C normally is between 0.3 and 1.9, and in the case of a mast structure and rigging to be described further on, perhaps between 2 and 3, and the density is approximately 1.2 kg/m³. In this case the angle is larger, normally between 10° (if the inventive mast is used) and 45°, and the speed v is the speed of the apparent wind, which is higher than the speed through water. The combined forces from the wings preferably equal the force from the sail in order to achieve balance of forces.

Rigging

The booms 41, 42 of the rigging preferably should be wide to lessen losses from the suction side of the sail to the pressure side thereof and to adjust the sail belly. The angle of the booms should be easy to adjust, and preferably this is achieved by sheeting against the mast. In addition, the sail 40 should seal against the booms in order to prevent air from escaping between booms and sails.

A sail has a pressure side and a suction side. The pressure differential between them causes air to flow from the pressure side to the suction side, with resulting loss of speed and less efficient utilisation of the wind power. In the inventive sailing vessel such crossover flows are counter-acted primarily by arranging wide booms 41, 42 at the top and at the bottom of the sail 40. Modern sailing technique provides for boom adjustments by way of sheets attached to the boom and running vertically downwards towards the hull. Owing to their width, these booms may be adjusted relative to the mast. The adjustment may be performed for example by means of wires or sheets 43 which run from the periphery of the boom to the mast, and preferably are placed approximately at the middle of the booms. In this case it is advantageous to equip the mast with means, known as spreaders 44, which extend crosswise relative to the extension of the booms and to which the wires are drawn, in order to achieve a stronger moment of force. In turn, shrouds and stays that provide a counter-acting force advantageously are provided to stabilise the spreaders. By means of the moment of force thus obtained, the sheets are able to adjust the booms. Preferably, the sheets run via blocks interiorly of the mast cover to the cockpit.

Advantageously, the booms are manufactured from a high-strength composite material, giving them low weight and making them easy to handle. Sheet attachment points preferably are arranged on the periphery of the upper boom 42, their action reaching far outwardly from the plane of the sail, and providing a moment of force allowing the sail to be sheeted optimally. In the aft part of the booms attachments are provided to tighten the sail in order to adjust its belly. Holes, if any, in the booms for adjustment of the belly profile could be covered by battens or similar means in order to prevent air from leaking from the pressure side to the suction side.

However, the lower boom 41 could advantageously be sheeted directly against the hull in the conventional way.

Figure 2:
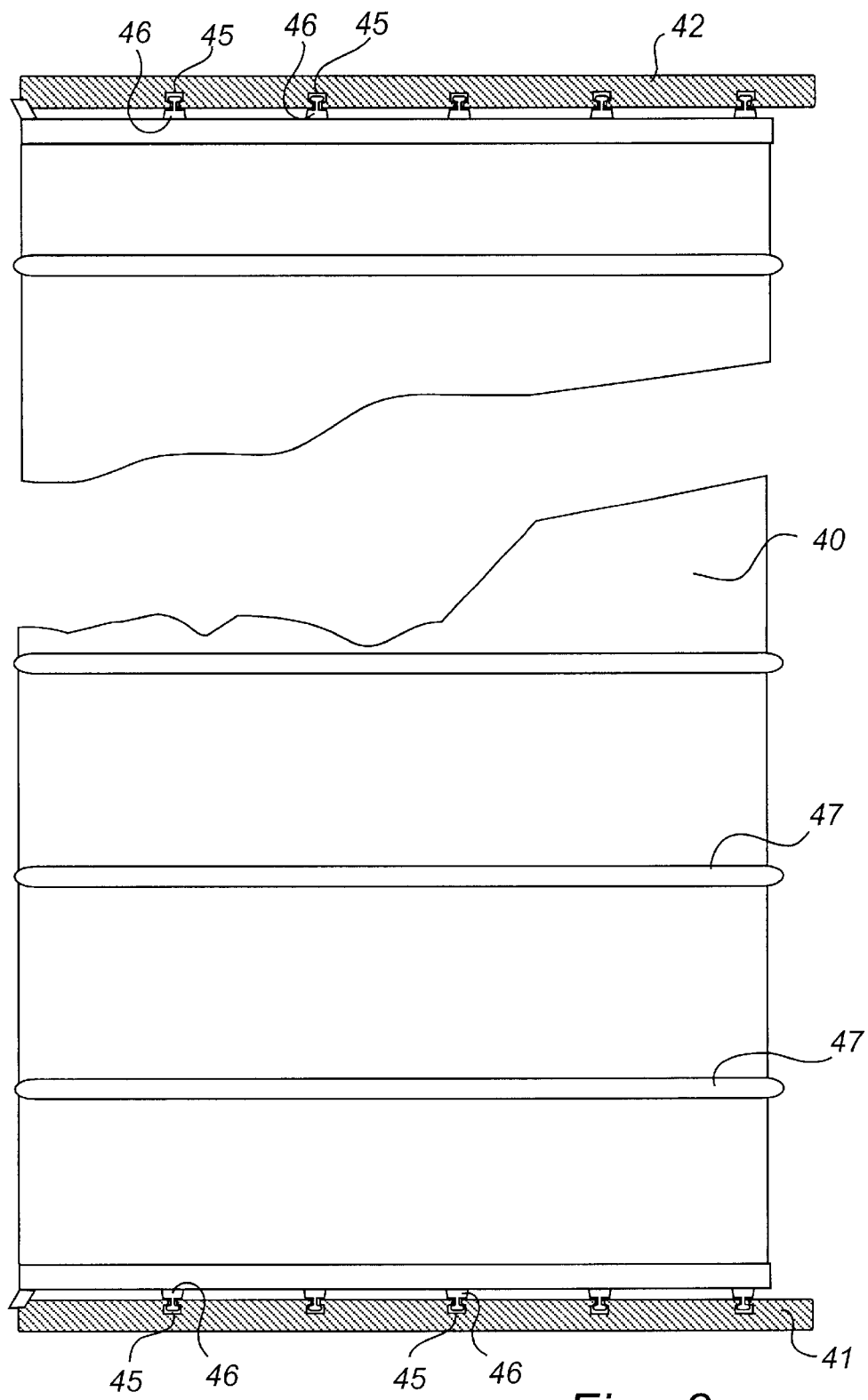
FIG. 2 is a lateral view showing in more detail sails and booms of the vessel of FIG. 1.

In accordance with a preferred embodiment, shown in more detail in FIG. 2, the booms are configured as plates having grooves 45 formed therein on the face turned towards the sail. The grooves 45 preferably have a predetermined length between the long sides of the boom, i.e. essentially across the lengthwise extension of the boom. On its sides facing the booms, the sail furthermore comprises sheet travellers 46 fitting the grooves. By displacing the travellers 46 inside the grooves 45, the belly of the sail may be altered. The configuration, and above all the extension, of the grooves 45 determine the appearance of the belly of the sail. The position of the travellers 46 can also be set individually to obtain an optimum belly configuration.

The phenomenon known as the "twist" of the sail is the different angle to the wind in the upper and the lower parts of the sail. This phenomenon is desirable above all in the following cases:

When the winds are laminar (<3 m/s).

When the wind power becomes too strong.

When the sea has superposed short waves.

When the temperature of the water exceeds the temperature of the air.

When the water is warmer than the air, sudden gusts may arise so rapidly that the crew will not have sufficient time to parry by sheeting before the wind power widely exceeds the counter-acting force. Therefore, when twist is desired, the sheet of the upper boom is fastened in accordance with the invention via an elastic wire in order to flex outwards under conditions of load, thus causing a twist in the sail. The sail could be a fully battened sail and consequently be equipped with stabilising battens 47. However, the sail could also consist of a continuous, comparatively rigid laminate composite material.

Figure 3:
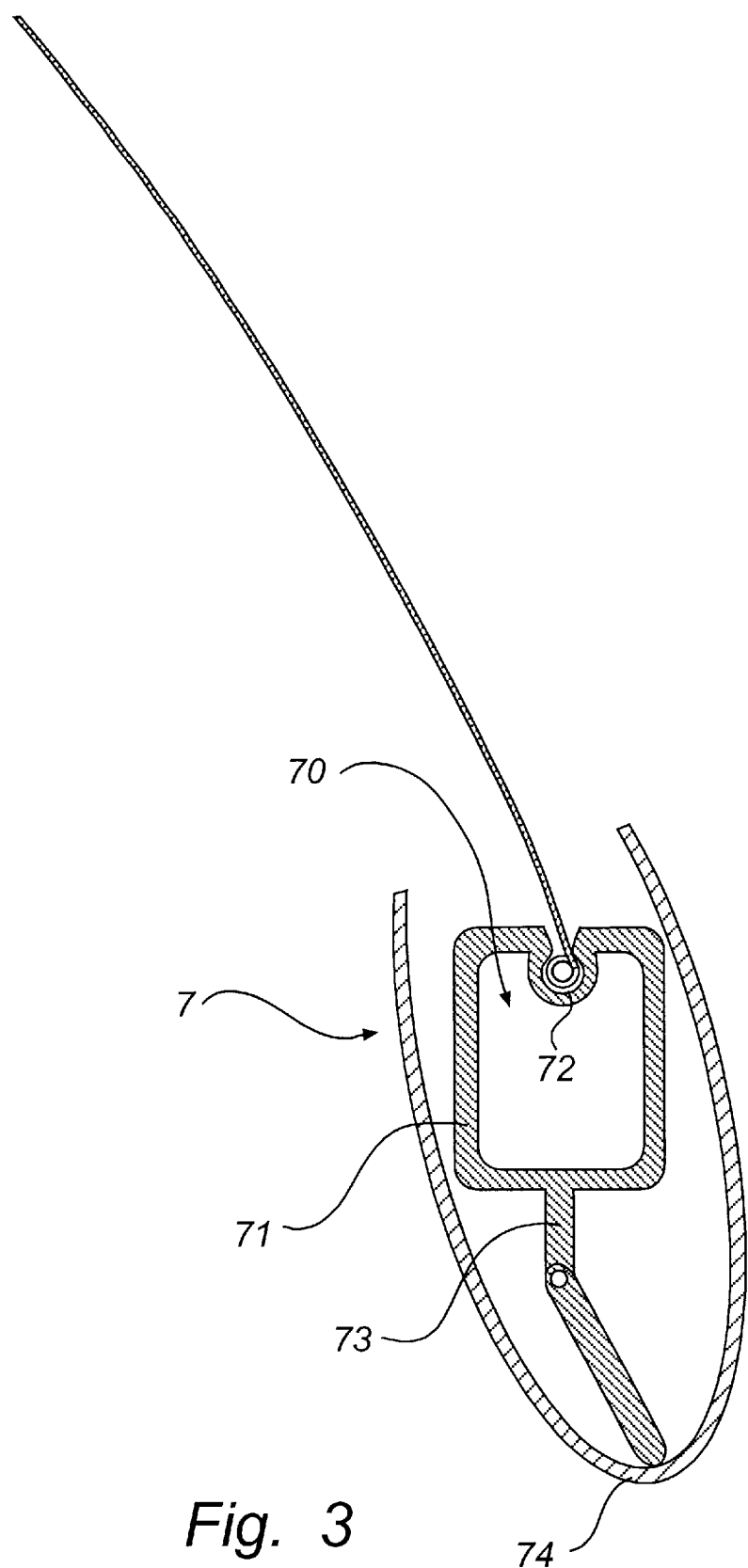
FIG. 3 is a cross-sectional view of the sails and the masts of the vessel of FIG. 1.

Advantageously, the mast is designed so as to comprise an inner core 70 of a distance-holding material and an external load-supporting cover 71, as shown particularly in FIG. 3. This makes the mast simple and inexpensive because no shaping of the profile component 70 need to be made but the cross-section may be for example quadrilateral, and preferably rectangular. A rail 72 may be secured to the rear part of the mast, serving to attach the sail to the mast. At the front, a holding means 73 preferably is arranged, which means could likewise be in the form of a rail. The aerodynamics of the mast are then improved by means of a profile cover 74, such as a foil or a sail cloth, which is distended by means of profile members spaced along the mast, and which is stretched along the mast, for example in a forward rail on the latter, such that the mast is covered by a hydro-dynamically shaped profile component. Alternatively, the cover is manufactured as a thin profile component of a composite material, which is articulated at the front in the same manner. The profile component abuts against the rail at the front, so as to be able to turn by itself against the wind (of speed) This is the aerodynamically most favourable design, since it minimises the losses of the mast and the flow across the sail becomes the most efficient owing to minimum stagnation of the stopping lee airflow. Had the mast been equipped with a fixed unarticulated profile component, the flow would not have become turbulent, which is desirable in order for the "flushing clean" of the stagnant air to occur (the angle of the profile component would have been wrong). Alternatively, the cover 74 may be mounted on a holding means 73, which is formed with an articulated joint, as shown in FIG. 3. It is essential, however, that the cover 74 may be turned relative to the stationary part 71 of the mast.

Similar aerodynamically configured covers may advantageously be mounted on for example stays, so as to pivot in a vane-like manner. This arrangement reduces the air resistance further.

The mast preferably is stayed from horizontally projecting outriggers including stays 75, and in addition, it is advantageously equipped with spreaders 76. Furthermore, the vessel has another front stay 77, which is attached to the fore part of the hull, and optionally additional stays.

When the upper boom is sheeted towards the mast, a rotational moment is generated that tends to rotate the entire mast in the opposite direction. This moment could also be counter-acted by attaching the front stay 77 in a wedge-shaped member 78 or in a rod, which is fixedly mounted in the top part of the mast. The increasing force in the fore stay upon increased wind counter-acts, owing to the attachment in the wedge-shaped member (to the fore of the mast), the rotational forces of the boom originating from the sail. The points of attack, i.e. the points of attachment of the stay in the wedge and the location of the boom, should be close to each other vertically. A stay, known as a kick 79, connects the upper end of the wedge 79 or a prolongation thereof, with the boom. In addition, the wedge provides increased stiffness, thus counter-acting the force developed in upper-boom kick and tending to bend the top of the mast in the aft direction. Both forces, the one from the boom tending to rotate the mast and the one from the wedge, which is stretched via the fore stay, increase as the wind increases and are in balance with one another.

Preferably, the sail 40 is attached to the upper boom 42 before being hoisted. It is then hoisted, moving in a rail 72, in abutment against the mast. Preferably, the sail is formed with battens 47 extending from sail edge co sail edge or alternatively it could consist of a thin (approximately 0.25 mm) laminated composite-material component. In this manner, the desired belly configuration may be obtained in all parts of the sail. Various belly configurations are achievable from the lower to the upper boom, which may be desirable for instance when the airflow is laminar and thus increases from the surface of the water (0 m/s) to the top of the mast, where the wind has the maximum relative velocity. The force that the sail is capable of developing is $F=C*\rho*A*\sin(\alpha)*v^2$, wherein C is a coefficient that determines the efficiency of the sail, $\rho$ is the density of air, $\rho air=1.2$ kg/m$^3$, A is the area, $\alpha$ is the angle to the wind, and v is the velocity of the apparent wind. C varies with the efficiency of the sail and the angle to the wind. In a conventional Bermuda sail, C usually is 1.2 at the most. In more recent sailing vessels, C may be somewhat higher. In the rigging in accordance with the invention, C is estimated to reach even higher values, closer to 2. Since in high-velocity sailing, the wind usually is less than 50°, in the inventive sailing vessel C will be close to its maximum efficiency value, i.e. close to 2 most of the time.

The sheet preferably is controlled by means of a winch, at which point the upper and lower booms may be interconnected. Twist is achieved most conveniently by different sheeting in the upper and the lower boom. When the temperature of the water exceeds the temperature of the air, the gusts of air may be very powerful and sudden, and in such cases a rubber band may be used to stretch the upper sheet. When the gusts of air are powerful, making it desirable that the sail force is twisted away temporarily, the rubber band stretches automatically to produce the twist (forms a soft rig) The main sail halyard is winch-actuated. The top kick is winch-operated, possibly by means of the same winch as the halyard, and is locked at the top. The angle of the wings may be adjusted by means of a wheel, which controls the hydraulic pistons. The belly in the upper and lower boom is stretched by means of a line or wire. In accordance with an alternative, fixed boom profile components are folded inwards towards the leeward side of the sail, and change the sail belly in predetermined steps. Because the wind is more stereotyped in the case of high-velocity sailing than in the case of slow sailing, the need for adjustment of the belly becomes smaller.

The rigging as described, as well as the mast, etcetera, is particularly suitable for use in conjunction with a vessel having submerged wings as described previously. It is appreciated, however, that masts and riggings of the kind described could be used also in other types of vessels.

Rudder

Preferably, the sailing vessel in accordance with the invention has double rudders 5 placed to the rear of the stern, one on either side of the hull. This arrangement makes the flow past the rudder laminar. The flow losses when a single rudder is used, located centrally at the stern, causing turbulent flow, are many times higher than in the case of undisturbed laminar water flows. For this reason, the rudder is divided into two parallel rudders located astern externally of the hull, such that they are situated in undisturbed water. The total flow losses therefore are much smaller compared with the losses from one rudder positioned astern, while at the same time the rudder effect is doubled and yet still is symmetrical relative to the hull.

Owing to the location of the rudders in accordance with the invention, the rudders generally are situated in laminar flows. Measurement of rudder forces has shown that laminar flows offer a flow resistance that is but approximately 10% of the resistance in turbulent flows. The conventional rudder located astern produces turbulent flows. By arranging two rudders as taught-herein the steering force consequently is doubled and the resistance is only 20% of that of a conventional rudder located astern.

Preferably, the rudders are feet-operated via pedals and wires.

In addition, the rudders preferably also are equipped with wings 51, which are located near the lower end of the rudder wings 50 such that during sailing they normally are submerged in water and extend essentially horizontally. The wings 51 may be set at an angle, whereby a downward directed force is produced that counter-acts any tendencies of the vessel to heel as might be occasioned by moment forces generated at high velocities owing to the forwards drive of the sail and the decelerating effect of the wings 3.

CONCLUSION

It is difficult to determine an upper limit as regards the maximum velocity that the sailing vessel in accordance with the invention may obtain. Theoretically, very powerful wind forces may be made use of and be balanced in accordance with the principle of such work. Some novel problems arise in connection with higher speeds. The profile configuration of the wings may need adaptation, for example to a wedge-shaped configuration. The reason therefor is that relief maybe achieved when the pressure of the suction side becomes sufficiently low for evaporation of the water (owing to the steam pressure). That releases the counter-acting force (approximately half remains) and even reversal of the forces may occur, i.e. the deflection is to occur in the opposite direction. Sailing vessels in accordance with the invention, sea yachts, could very well sail at the velocities obtainable by ice yachts.

It is likewise possible to expand the size of the vessel to allow it to carry loads. Already a sea yacht having a length of about 8 meters is able to carry sufficiently heavy loads to allow comfortable onboard living in dry conditions, with the horizontal arms assuming a position spaced somewhat above the waves and the vertical arms projecting some distance away from the hull. By increasing the size further, it becomes possible also to accept heavier loads onboard. Adjustment of the counter-acting force may in this case be made also by lateral displacement of for example the windward vertical arm because the horizontal arm is displaceable laterally. In this manner, it becomes possible to reduce the width, for instance in harbours.

When the sail drives and the wings decelerate, a moment is created that will tilt the vessel forwards, which is a phenomenon known for instance from sailing with catamarans, the hull of which has a strong braking effect at speeds above 30 knots. The apparent wind comes from ahead, but this still means that a forwards directed force is generated that acts on the sail. Optionally, the rudders or an aft "height rudder" at a small angle may be arranged to resist the tilting force.

The hull of the vessel in accordance with the invention is very light and the sail force in relation to the weight of the vessel is very favourable. This ratio is known as SCP/w, SCP standing for Sail Carrying Power and w for the total weight. In case of a ratio SCP/w of about 30%, the boat planes also when beating. SCP/w for the inventive vessel normally exceeds 100%, calculated on the weight at rest. The dynamically downward force from the windward wing does, however affect the sailing yacht as a weight. SCP/w should nonetheless exceed 30% already in weak winds and the SCP/w improves with increasing wind force. By using also the opposite wing, the leeward wing, to support the hull, SCP/w is improved such that the velocity increases and in addition, wave-induced losses and the like are reduced.

The invention has been described above by means of one embodiment. It should be appreciated that numerous varieties of the invention are possible. For example, the wings could be attached in a different manner, be controlled by other types of actuating means, such as mechanical ones, the rigging could be designed differently, and so on. The wings could likewise be controlled automatically. These and other obvious varieties should be regarded to be within the scope of protection of the invention as the latter is defined in the appended claims.

What is claimed is:

1. A sailing vessel comprising a hull, two outriggers, one on either side of the hull, a rudder, and rigging supporting at least one sail, wings secured to the outriggers and arranged to be located below the surface of the water during sailing, the wings including a leeward wing and a windward wing, the leeward wing being arranged, as the vessel moves through water, to exert an upwards directed force and the windward wing being arranged to exert a downwards directed force to counteract rotational force from the at least one sail, and that the inclination of the wings relative to the surface of the water and to the direction of travel and thus the magnitude of the upwards and downwards directed forces is adjustable by means of actuating means, the actuating means being accessible from a cockpit, and the outriggers and a sail center, which is part of said rigging, being arranged on the hull essentially at a same distance from the bow.

2. The sailing vessel as claimed in claim 1, wherein the vessel is without keel or centerboard.

3. The sailing vessel as claimed in claim 2, wherein the actuating means for controlling the wings are one of hydraulic, electric and mechanical.

4. The sailing vessel as claimed in any one of claims 1–3, wherein the wings are arranged to jointly exert a turning force on the vessel that essentially entirely compensates the turning moment caused by the wind in the sails.

5. The sailing vessel as claimed in claim 1, wherein the outriggers comprise essentially horizontally projecting arms and, at the end portions of said arms, essentially vertical arms, the wings being mounted on said vertical arms.

6. The sailing vessel as claimed in claim 1, wherein the rigging further comprises at least one boom having a width perpendicularly to the plane of extension of the sails that is at least equal to the width of the mast.

7. The sailing vessel as claimed in claim 6, wherein the rigging comprises at least one boom having a width perpendicularly to the plane of extension of the sails that is at least equal to the width of the mast and in addition is so connected to the mast, via stays that sheeting against the mast becomes possible.

8. The sailing vessel as claimed in claim 1, wherein the rudder comprises two spaced-apart rudder-blades projecting from either side of the hull.

9. The sailing vessel as claimed in claim 1, wherein the rudder comprises at least one wing arranged to be submerged below the surface of the water during sailing, said wing, when moving through the water, being arranged to exert a force counter-acting tilting of the vessel.

10. The sailing vessel as claimed in claim 1, further comprising at least one sheet that retains the boom in position, the at least one sheet being elastically extensible in order to provide some automatic adaptation to the wind force.

11. The sailing vessel as claimed in claim 1, further comprising a mast, the mast includes an interior supporting part arranged to support the sail, and covering part pivotally mounted on the supporting part on the side thereof remote from the sail, said covering part having an arcuate configuration and partly enclosing the supporting part.

12. The sailing vessel as claimed in claim 1, further comprising at least one stay or shroud which is at least partly enclosed by a pivotally mounted covering part having an arcuate profile configuration.

13. The sailing vessel as claimed in claim 1, wherein at least a portion of the outrigger parts that project essentially horizontally from the hull have a wing-like profile configuration, whereby the airflow past the outriggers contribute to exerting a lifting force on the vessel.

14. The sailing vessel as claimed in claim 1, wherein at least a portion of the outrigger parts that during sailing normally are above the surface of the water is provided with flaps arranged to exert a controllable decelerating effect on the passing airflow.

15. The sailing vessel as claimed in claim 1, wherein the wings have an average density exceeding 0.5 * (density of water).

16. The sailing vessel as claimed in claim 1, wherein the ratio of area of one of the upper and lower sides of the wings to the sail essentially is equal to the ratio of the density of water to air.

17. The sailing vessel as claimed in claim 1, wherein the wings are arranged to be set during sailing in such a way that the combination of forces developed by the wings, which forces could be described as $F=C*\rho*A*\sin(\alpha)*v^2$, wherein $\rho$ is the density of water, A is the area of the wing, $\alpha$ is the angle to the passing water flow, and v is the speed of the flow, essentially equals the turning force from the sail, which force could be described as $F=C*\rho*A*\sin(\alpha)*v^2$, wherein $\rho$ is the density of air, A is the area of the sail, $\alpha$ is the angle to the apparent wind, and the speed v is the speed of the apparent wind.

18. The sailing vessel as claimed in claim 1, wherein the outriggers during sailing defines an untouched water surface between the hull and arms of the outriggers supporting the wings.

19. The sailing vessel as claimed in claim 1, wherein the wings are manually controllable.

20. The sailing vessel as claimed in claim 1 further comprising means for simultaneous adjustment of the inclination of both of the wings relative to the direction of travel.

21. The sailing vessel as claimed in claim 20, wherein the means for adjusting comprises actuating means that are connected to control means, said control means being accessible from the cockpit.

22. The sailing vessel as claimed in claim 1, wherein the rigging further comprises at least one boom having a width perpendicularly to the plane of extension of the sails that exceeds the width of the mast.

23. The sailing vessel as claimed in claim 1, wherein the rudder comprises two spaced-apart rudder blades projecting from the prolongation of said hull.

24. The sailing vessel as claimed in claim 1, wherein the wings have an average density essentially equaling the density of water.

25. A sailing vessel comprising:

a hull;

two outriggers, one on either side of the hull;

a rudder;

rigging supporting at least one sail; and wings secured to the outriggers and arranged to be located below the surface of the water during sailing, the wings including a leeward wing and a windward wing, the leeward wing being arranged, as the vessel moves through water, to exert an upwards directed force and the windward wing being arranged to exert a downwards directed force to counter-act rotational force from the at least one sail.

* * * * *